United States Patent [19]

Engström

[11] Patent Number: 4,813,380
[45] Date of Patent: Mar. 21, 1989

[54] METHOD AND APPARATUS FOR CONTROLLING THE OPERATION OF A FLUIDIZED BED REACTOR APPARATUS

[75] Inventor: Folke Engström, San Diego, Calif.

[73] Assignee: A. Ahlstrom Corporation, Karhula, Finland

[21] Appl. No.: 129,394

[22] Filed: Nov. 24, 1987

Related U.S. Application Data

[63] Continuation of Ser. No. 926,719, Nov. 4, 1986, abandoned.

[30] Foreign Application Priority Data

Nov. 19, 1985 [FI]  Finland ................................. 854543

[51] Int. Cl.$^4$ .......................................... F23C 11/02
[52] U.S. Cl. ................................... 122/4 D; 110/245; 110/263; 110/347
[58] Field of Search ............... 122/4 D; 110/234, 245, 110/263, 345, 346; 34/57 A; 431/17; 60/39–46; 165/104.16; 432/15, 58

[56] References Cited

U.S. PATENT DOCUMENTS

| | | |
|---|---|---|
| 2,719,631 | 10/1955 | Vicard . |
| 2,901,420 | 8/1959 | Evans . |
| 2,994,666 | 8/1961 | Hinds, Jr. . |
| 3,058,817 | 10/1962 | Irani . |
| 3,100,693 | 8/1963 | Klein et al. . |
| 3,116,238 | 12/1963 | Van Etten . |
| 3,159,494 | 12/1964 | Lawrence et al. . |
| 3,677,715 | 7/1972 | Morrison et al. . |
| 3,698,874 | 10/1972 | Zenz . |
| 3,823,693 | 7/1974 | Bryers et al. ..................... 122/4 D |
| 3,897,739 | 8/1975 | Goldbach ..................... 110/245 X |
| 4,001,121 | 1/1977 | Bielefeldt . |
| 4,103,646 | 8/1978 | Yerushalmi et al. ............... 122/4 D |
| 4,108,778 | 8/1978 | Lambert et al. . |
| 4,154,581 | 5/1979 | Nack et al. ..................... 122/4 D X |
| 4,165,717 | 8/1979 | Reh et al. ..................... 122/4 D |
| 4,198,290 | 4/1980 | Summers . |
| 4,205,965 | 6/1980 | Bielefeldt . |
| 4,300,625 | 11/1981 | Mikhailov et al. ........ 165/104.16 X |
| 4,311,670 | 1/1982 | Nieminen et al. ............... 34/57 A X |
| 4,312,301 | 1/1982 | Anson ..................... 122/4 D |
| 4,419,966 | 12/1983 | Jenkins ..................... 122/4 D |
| 4,427,053 | 1/1984 | Klaren ..................... 122/4 D X |
| 4,473,033 | 9/1984 | Strohmeyer, Jr. ............... 122/4 D |
| 4,522,154 | 6/1985 | Taylor et al. ..................... 122/9 D |
| 4,594,967 | 6/1986 | Wolowodiuk ..................... 122/4 D |
| 4,664,887 | 5/1987 | Engstrom . |
| 4,672,918 | 6/1987 | Engstrom et al. ............... 122/4 D |
| 4,699,068 | 10/1987 | Engstrom ..................... 110/216 |
| 4,708,092 | 11/1987 | Engstrom ..................... 122/4 D |

FOREIGN PATENT DOCUMENTS

| | | |
|---|---|---|
| 126001 | 11/1984 | European Pat. Off. . |
| 0033808 | 3/1985 | European Pat. Off. . |
| 115328 | 11/1899 | Fed. Rep. of Germany . |
| 598423 | 5/1932 | Fed. Rep. of Germany . |
| 1442745 | 2/1969 | Fed. Rep. of Germany . |
| 1767699 | 9/1971 | Fed. Rep. of Germany . |
| 812596 | 9/1982 | Finland . |
| 1325323 | 3/1963 | France . |
| 58-148305 | 9/1983 | Japan . |
| WO80/00153 | 12/1980 | PCT Int'l Appl. . |
| WO85/00027 | 9/1985 | PCT Int'l Appl. . |
| 7051 | 12/1982 | Sweden . |
| 879144 | 11/1981 | U.S.S.R. . |
| 2018961 | 10/1979 | United Kingdom . |
| 2034448 | 6/1980 | United Kingdom ............... 122/4 D |
| 2104408 | 3/1983 | United Kingdom . |
| 2159726 | 12/1985 | United Kingdom . |
| 2160119 | 12/1985 | United Kingdom . |

*Primary Examiner*—Steven E. Warner
*Attorney, Agent, or Firm*—Nixon & Vanderhye

[57] ABSTRACT

Solids are separated from the flue gases of a fluidized bed reactor with a circulating bed and provided with cooling surfaces and are recycled to the reactor through return ducts disposed at different heights in the reactor. To control the operation of the reactor the heat removed from the reactor chamber is regulated by changing the suspension density in the reactor chamber. A required suspension density is obtained by regulating the flow of the solids through each return duct.

4 Claims, 1 Drawing Sheet

METHOD AND APPARATUS FOR CONTROLLING THE OPERATION OF A FLUIDIZED BED REACTOR APPARATUS

This is a continuation of application Ser. No. 926,719, filed Nov. 4, 1986, now abandoned.

The present invention relates to a method of controlling the operation of a fluidized bed reactor apparatus by separating solids from the gases exhausted from the reactor chamber and recycling them to the reactor, and to a method of removing heat from the reactor by heat transfer included included in the reactor chamber. The method is characterized in that the flows of solids which are recycled at least at two different heights are controlled to obtain the required suspension density of the fluidized solids and thus the required heat transfer at different heights in the reactor chamber. The invention also relates to an apparatus for carrying out the method.

To reach optimal combustion and reaction conditions (e.g. for $SO_2$ absorption) it is necessary to be able to create the correct temperature in the fluidized bed reactor chamber and to maintain the temperature stable. This is problematic if there are changes in the calorific value of the fuel or reactor chamber loading.

U.S. Pat. No. 4,165,717 discloses how heat transfer to the cooling surfaces disposed in a reactor can be affected by changing the ratio and the volume of the primary and the secondary air thus changing the suspension density. The adjustment range is, however, limited as a change in the ratio of primary and secondary air affects other process parameters, also and not only the temperature.

European patent specifications Nos. 33808 and 126001 disclose a method according to which the solids separated from the gases exhausted from the reactor chamber are recycled to zones located at different heights in the reactor chamber in order to regulate the temperature in these zones but the temperature regulation according to these methods is based on feeding cooled solids into the reactor chamber.

It is an object of the invention to provide a method of controlling the temperature of a circulating fluidized bed boiler in such a way that the temperature is kept at a predetermined level despite of the changes in the loading apparatus or in the calorific value of the fuel. This is achieved by regulating the suspension density of the solids circulated in the reactor or combustion chamber. A change in the suspension density affects heat transfer to the cooling surfaces of the boiler and thus the temperature in the combustion chamber.

According to the present invention there is provided a method of controlling the operation of a circulating fluidized bed apparatus by separating solids to be recycled to the reactor chamber thereof from the gases exhausted from the reactor chamber by heat transfer surfaces disposed in the reactor chamber characterized in that the solids being recycled are introduced into the reactor at different heights and that each flow of solids is controlled so as to provide a required suspension density of the fluidized solids and thus a required heat transfer in zones at different heights in the reactor.

Also according to the invention there is provided a fluidized bed reactor apparatus including means for separating solids contained in the flue gases exhausted from the reactor chamber and means for recycling the solids to the reactor chamber, and heat transfer surfaces as part of the reactor chamber, characterized by the feature that the recycling means comprise a plurality of return ducts for feeding the solids into zones at different heights in the reactor chamber and means for controlling the solids flowing through each return duct.

The present invention permits for example the following advantages:
a construction which is simple and reliable
an operation control which is simple
an adjustment range which is wide.

BRIEF DESCRIPTION OF THE DRAWINGS

The invention will be described further, by way of example, with reference to the accompanying drawing in which.

Figure 1:
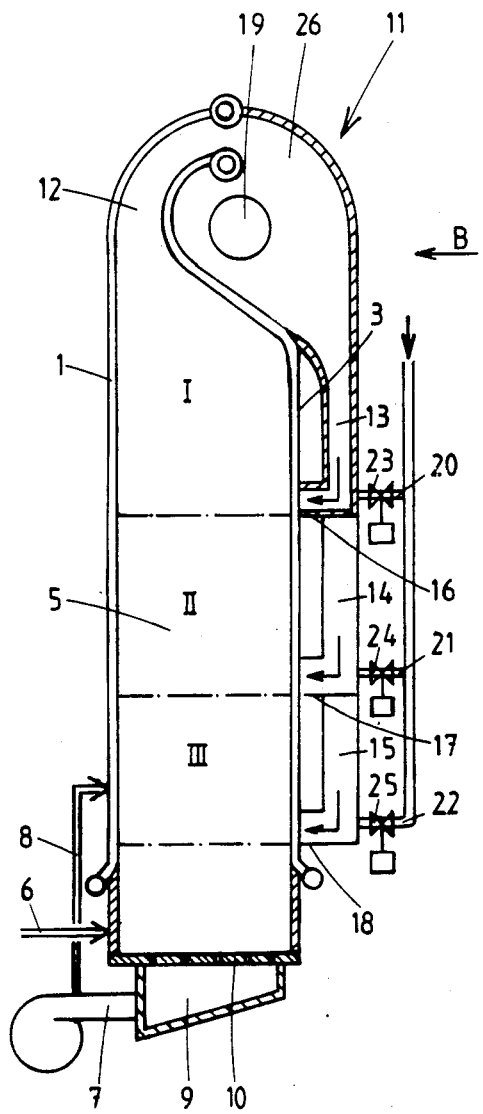
FIG. 1 is a schematical vertical section through fluidized bed reactor apparatus according to an embodiment of the invention and taken along line A—A of FIG. 2.

A steam boiler as illustrated in the drawings comprises a reactor chamber 5 defined by walls 1 to 4 and further comprises tubes welded to each other by methods known per se. The tubes which function as the heat transfer surfaces of the boiler are connected to the water steam system of the boiler in a nondisclosed way.

A fuel inlet 6 is connected to the bottom portion of the reactor chamber 5 to feed thereinto. Also a primary air inlet 7 and a secondary air inlet 8 are connected to the bottom portion of the reactor chamber 5 to feed thereinto. Primary gas is supplied to a plenum or air chamber 9 and is evenly distributed over the cross section of the whole reactor by a perforated distributor plate 10.

A horizontal-axis cyclone separator 11 is provided at the top of the reactor chamber 5. A gas channel 12 connects the cyclone separator to the reactor chamber 5.

The cyclone separator 11 is provided with three adjacent return ducts 13, 14 and 15 for returning the separated solids and their lower ends 16, 17 and 18 are connected to the reactor chamber 5. The cyclone separator 11 has a gas exhaust pipe 19 for the purified gas. The lower end of each return duct is provided with an air supply pipe 20, 21 and 22 having a regulating valve 23, 24 and 25.

The flue gases which are exhausted from the reactor chamber 5 and carry solids, flow to a vortex chamber 26 of the separator 11 through an inlet channel 12 connected tangentially to the vortex chamber 11.

The solids concentrating at the outer periphery of the vortex chamber are carried out by the gas flow and are recycled to the reactor chamber through ducts 13 to 15. The purified gases are removed through pipe 19 disposed in the end wall of the vortex chamber.

Air may be supplied through pipes 20 to 22 in the lower, L-shaped ends of the return ducts. If air is not supplied the duct in question will be clogged and the solids to be recycled to the reactor will flow through the other ducts. The flow of solids passing through the ducts can be regulated by adjusting, via valves 23 to 25, the volume of air supplied in the lower ends of ducts 13 to 15. In this way unequal flows of solids through each duct can be brought about.

As the solids fall by virtue of their own weight and are carried by the gas, the solids flow down the return duct and only a little air is needed to keep the ducts unclogged.

The lower ends of the return ducts situated at different heights feed solids into zones at corresponding heights in the reactor 5. Return duct 13 feeds the topmost zone indicated by the reference numeral I, return duct 14 feeds the zone in the middle with the reference numeral II, and return duct 15 feeds the lowest zone with the reference numeral III. The solids recycled into the reactor chamber 5 flow upwards carried by the gas flowing through the reactor chamber 5 and out of the reactor again. The solids passing through duct 13 flow through zone I, the solids passing through duct 14 flow through zones I and II, and the solids passing through duct 15 flow through zones I, II and III. Thus the flows of solids supplied to the reactor at different levels must travel unequal distances and remain in the reactor chamber for unequal periods which results in a different effect of each flow of recycled solids in the reactor.

The apparatus according to the invention provides for recycling either all of the solids to a certain zone or, divided in a required way, to different zones. In this way the distribution of the solids in the reactor chamber 5, i.e. the suspension density at different heights and thus the heat transfer can be controlled.

EXAMPLE 1

Figure 2:
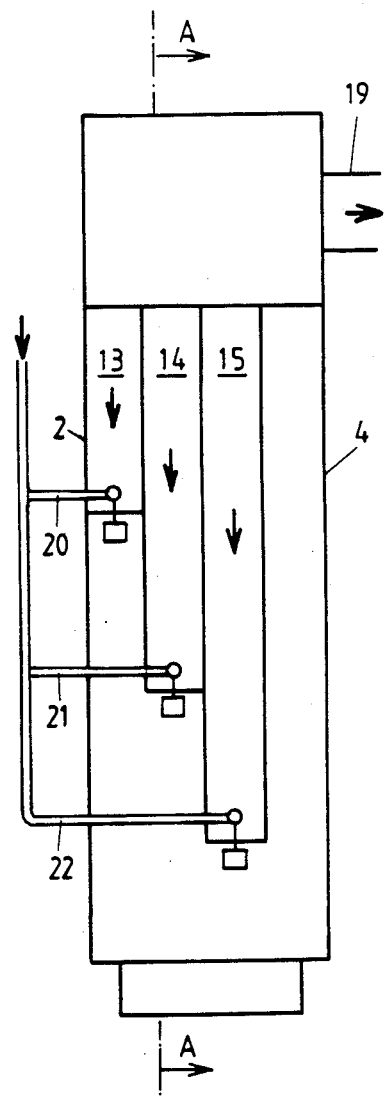
FIG. 2 is a schematical elevational view of the direction of arrow B of the apparatus illustrated in FIG. 1.

2.9 kg/s coal with a calorific value of 30.000 kJ/kg was supplied to a reactor constructed according to FIGS. 1 and 2 by an inlet feeder 6. 60% of the total air volume of 30 kg/s was primary air supplied in the reactor through inlet 7 and air distributor 10, and 40% of the total air volume was secondary air introduced into the reactor through air inlet 8 at approx. 4 m above the bottom.

The total height of the reactor was approx. 15 m. The circulating solids were recycled through duct 15 at the height of 1 m above the distributor plate. The combustion was carried out at approximately 800° C. with an air excess of approximately 22%. 37 MW was introduced to the reactor via membrane walls 1–4. When fuel with a high calarofic value such as coal was combusted solids were not recycled through ducts 13 and 14 located at the height of 4 and 10 m above the distributor plate. Mean suspension densities in zones III, II and I were 300, 60 and 8 kg/m$^3$, respectively.

EXAMPLE 2

The same reactor as in example 1 was used for combustion of peat, which is a fuel of low calorific value, i.e. 9900 kJ/kg, and which is ⅓ of the calorific value of coal. 9 kg peat was supplied in the reactor which required approximately 34 kg/s combustion air. By recycling approx. 70% of the circulated solids through duct 13 and approx. 30% through duct 14, a mean temperature of 920° C. could be maintained with and air excess of approx. 22%. The mean suspension densities in zones III, II and I were 200, 50 and 10 kg/m$^3$, respectively.

The invention is not limited to the embodiment or the examples described here but several various modifications can be made of it within the scope of protection defined by the patent claims.

We claim:

1. A method of controlling temperature in the reactor chamber of a recirculating fluidized bed apparatus comprising the steps of:
   (a) providing heat transfer surfaces in a plurality of zones at different heights in the reactor chamber;
   (b) separating solids from gases exhausted from the reactor chamber for recycling to the reactor chamber;
   (c) controlling the flow of said solids into each of the reactor chamber zones to provide a required suspension density of fluidized solids in each of said zones to thereby control the heat transfer to said surfaces in said zones and thereby maintain a predetermined range of temperatures in said zones of said reactor chamber independent of fuel and reactor loading.

2. Recirculating fluidized bed reactor apparatus comprising:
   means for separating solids contained in flue gases exhausted from a reactor chamber;
   means for recirculating said solids to zones at different heights within said reactor chamber;
   heat transfer means within each of said zones in said reactor chamber, and
   means for controlling the solids flowing into each of said zones to provide a required suspension density and therefore a required heat transfer in each of said zones, to thereby control the temperature in each of said zones.

3. Apparatus as claimed in claim 2, wherein the means for recirculating said solids comprise return ducts and wherein the means for controlling the flow of the solids comprise means for feeding gas, other than flue gas, into in the return ducts.

4. Apparatus as claimed in claim 2, wherein three return ducts are arranged to feed the solids to the reactor chamber at each of said zones.

* * * * *